(12) United States Patent
Bisset et al.

(10) Patent No.: US 6,590,222 B1
(45) Date of Patent: Jul. 8, 2003

(54) LIGHT DETECTION APPARATUS

(75) Inventors: David Lindsey Bisset, Wiltshire (GB); Michael David Aldred, Wiltshire (GB); Stephen John Wiseman, Cambridge (GB)

(73) Assignee: Dyson Limited, Wiltshire (GB)

( * ) Notice: Subject to any disclaimer, the term of this patent is extended or adjusted under 35 U.S.C. 154(b) by 0 days.

(21) Appl. No.: 09/868,493

(22) PCT Filed: Dec. 6, 1999

(86) PCT No.: PCT/GB99/04092
§ 371 (c)(1),
(2), (4) Date: Jun. 18, 2001

(87) PCT Pub. No.: WO00/38027
PCT Pub. Date: Jun. 29, 2000

(30) Foreign Application Priority Data

Dec. 18, 1998 (GB) .............................................. 9827771

(51) Int. Cl.[7] ........................... H01J 40/14; G01D 1/02; B60S 3/00
(52) U.S. Cl. ............................ 250/559.29; 250/559.33; 250/221; 701/26; 15/53.3
(58) Field of Search ............................ 250/221, 222.1, 250/206.1, 559.29, 559.33, 559.39; 318/568.11, 568.12, 580; 901/1, 47; 15/49.1, 53.1, 53.3; 701/23, 25, 26; 356/614, 622

(56) References Cited

U.S. PATENT DOCUMENTS

| | | |
|---|---|---|
| 5,440,216 A | 8/1985 | Kim |
| 5,001,635 A | 3/1991 | Yasutomi et al. |
| 5,635,724 A * | 6/1997 | Higgins .................. 250/559.29 |
| 6,059,657 A * | 5/2000 | Oh et al. ..................... 250/221 |

FOREIGN PATENT DOCUMENTS

| | | |
|---|---|---|
| JP | 10103923 | 4/1998 |
| WO | WO 98 33103 A | 7/1998 |

* cited by examiner

Primary Examiner—Kevin Pyo
(74) Attorney, Agent, or Firm—Morrison & Foerster LLP

(57) ABSTRACT

Light detection apparatus for determining the location of a body within a predetermined area comprises at least two light detecting devices (10,10',10"), supported on the body and capable of receiving light at points which are spaced about a central axis (8). The apparatus further includes means for supplying information representative of the level of light detected by each light detecting device (10, 10', 10"). Information received from the light detection apparatus is compared with information previously received from the light detection apparatus and stored in a memory so as to identify when the light detected by the light detection apparatus is the same or substantially the same as light previously detected by the light detection apparatus. When used on an autonomous vehicle, this can allow the vehicle to determine when it has returned to a similar position in an area. The received light signals can be filtered or processed to derive information representative of different types of light (natural, incandescent) or colours of light.

28 Claims, 10 Drawing Sheets

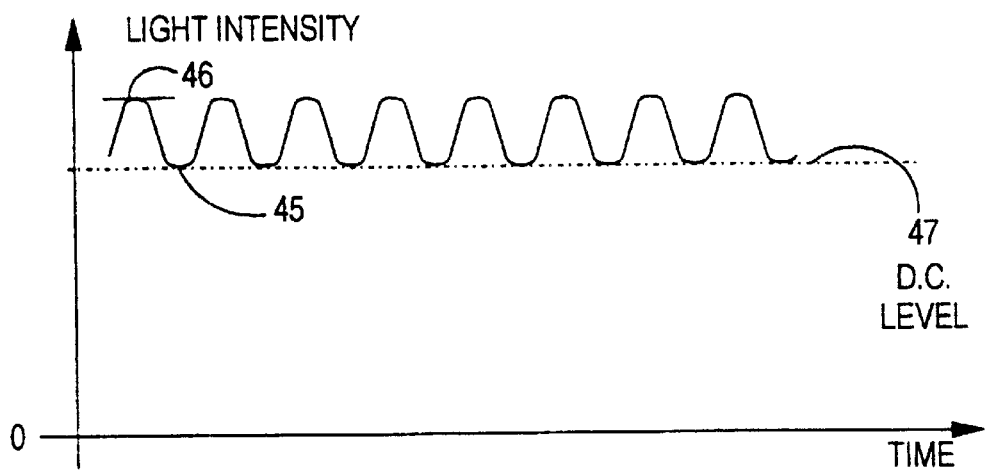
FIG.3.
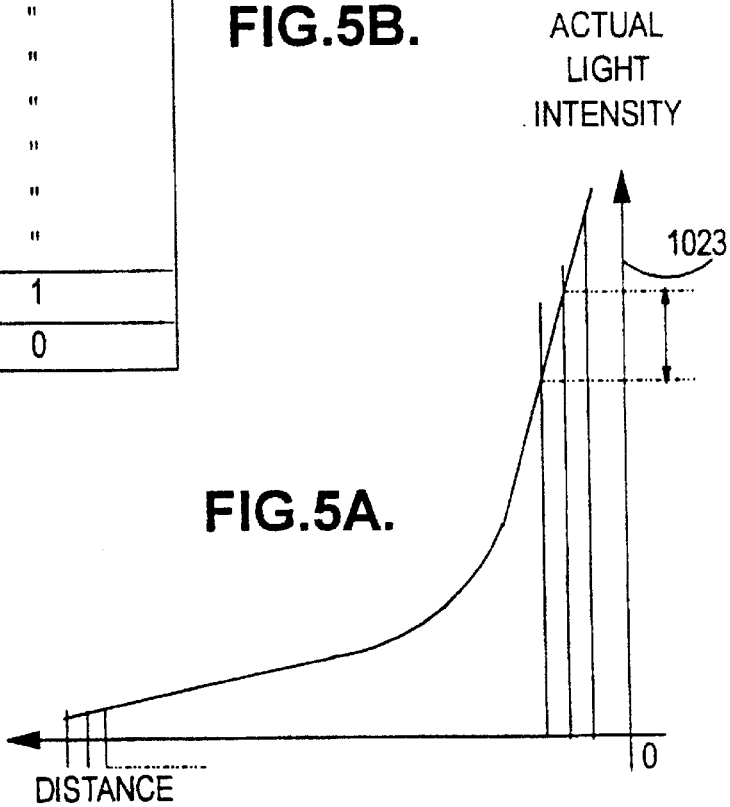
FIG.5B.
FIG.5A.

LIGHT DETECTION APPARATUS

This application claims priority to International Application No. PCT/GB99/04092 which was published on Jun. 29, 2000.

FIELD OF THE INVENTION

This invention relates to light detection apparatus for determining the location of a body within an area and to an autonomous vehicle, typically a robotic cleaning device, equipped with such light detection apparatus.

BACKGROUND OF THE INVENTION

An article entitled "A Compound Eye for a Simple Robotic Insect" at pages 166–173 of "RAM-based Neural Networks", published 1998, ISBN 981-02-3253-5 describes a machine which has light dependent resistors mounted on the top faces of a truncated icosahedron and which uses a discriminator network to estimate insect position in a room. The discriminator network requires training.

SUMMARY OF THE INVENTION

The present invention seeks to provide an improved light detection apparatus which is suitable for use on an autonomous vehicle.

A first aspect of the present invention provides light detection apparatus for determining the location of a body within an area, the apparatus comprising at least two light detecting devices for mounting on the body and capable of receiving light from the environment in which the body is located, the devices being located at respective detecting points which are angularly spaced about a vertical axis, means for supplying information representative of the levels of at least two different light types received at each detecting point, and means for comparing information received from the light detection apparatus with information previously received from the light detection apparatus and stored in a memory so as to identify when the light detected by the light detection apparatus is the same or substantially the same as light previously detected by the light detection apparatus.

A further aspect of the invention provides an autonomous vehicle comprising power operated means for moving the vehicle around an area and a navigation system for identifying the location of the vehicle, the navigation system including the above described light detection apparatus for allowing the vehicle to determine when it has returned to a similar position in the area.

By deriving information representative of at least two different light types received at each detecting position, the apparatus can better discriminate a set of light measurements taken at one position in an area from another position in the area. For example, the overall light level in a particular direction may be the similar, but the relative amounts of the light types making up that similar level may be quite different. The light types can be ambient light and artificial light, such as incandescent light and fluorescent light. The information about different light types can be derived by filtering or by processing the signal received by each light detecting device to derive information about the level of constant (natural light) and time-varying (artificial) light types. The apparatus is particularly useful in an indoor environment where there is usually a mixture of natural and artificial light, the respective light sources being differently positioned within a room.

The light detecting devices can be phototransistors or photodiodes. Alternatively, they can be a CCD array.

Preferably, the points at which light is received are spaced equi-angularly about the vertical axis. This gives the apparatus rotational symmetry.

Preferably, the light detection devices are all supported in a horizontal plane.

Preferably there are at least four, and more preferably, eight light detecting devices.

The light detecting devices can be supported within a housing which can be mounted on an autonomous vehicle.

The autonomous vehicle can be a robotic floor cleaning device, such as a robotic vacuum cleaner.

Preferably the light detection apparatus is supported on an uppermost part of the body with the light detecting devices being supported so that they can receive light over an incident beam angle in a vertical plane extending upwardly from the horizon.

There have been a number of proposals to provide robotic or autonomous vacuum cleaning devices which can clean a floor area without the need for a human user to push or drag the cleaning device along the floor. These generally operate by performing a pattern of coverage of the floor area which is random or reciprocating. Some of these cleaning devices require navigation beacons to be installed in a room to allow the cleaning device to determine its position and to navigate around the floor area.

However, these are undesirable as they require installation in each room where a user wishes to use the cleaning device.

Accordingly, further aspect of the invention provides an autonomous floor cleaning device for cleaning a floor area comprising:

power operated means for moving the vehicle around the floor area and a navigation system for identifying the location of the vehicle and for controlling movement of the cleaning device, wherein the navigation system includes a light detection apparatus comprising:

at least two light detecting devices mounted on the body and capable of receiving light from the environment in which the cleaning device is located, the detecting devices being located at respective light detecting points which are angularly spaced about a vertical axis, means for supplying information representative of the level of light detected by each light detecting device, and means for comparing information received from the light detection apparatus with information previously received from the light detection apparatus and stored in a memory so as to identify when the light detected by the light detection apparatus is the same or substantially the same as light previously detected by the light detection apparatus, indicative of the cleaning device returning to a similar position in the area.

The use of the light detection apparatus can avoid the need for navigation beacons. The light detection apparatus is particularly useful where the cleaning device performs a spiralling pattern of coverage of the floor area. After each circuit of the floor area the cleaning device returns to a similar position in the area and this causes the cleaning device to step inwardly (if the spiral is an inward spiral) or outwardly (if the spiral is an outward spiral) by a step distance. The step distance can be fixed, such as one, or substantially one width of the cleaning device, or it can be selectable by a user.

Other aspects of the invention provide a navigation system and software for operating a control processor in a navigation system, which cause an autonomous vehicle to operate in the above way. Further aspects of the invention provide a method of determining position of a body within an area using the light detection apparatus and a method of controlling operation of a cleaning device using information received from the light detection apparatus.

BRIEF DESCRIPTION OF THE DRAWINGS

The invention will now be more particularly described, by way of example only, with reference to the accompanying drawings, in which:

FIG. 3 is an example of a signal returned by one of the light detecting devices in FIG. 1;

FIGS. 5A and 5B show how light measurements from the light detecting devices are converted;

DETAILED DESCRIPTION OF THE INVENTION

Figure 1A:
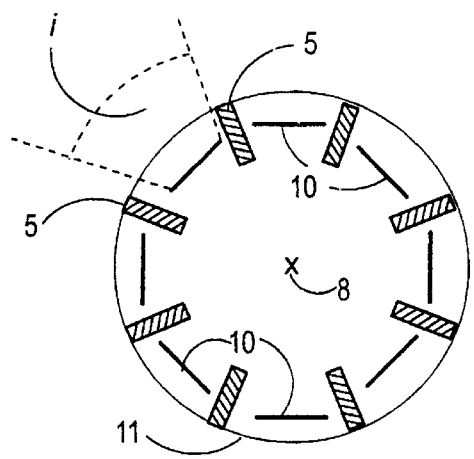
FIGS. 1A, 1B and 1C are schematic views showing three different embodiments of light detection apparatus according to the first aspect of the invention.

Referring firstly to FIG. 1A of the drawings, the light detection apparatus shown therein comprises eight light detecting devices 10, typically phototransistors or photodiodes, equi-angularly spaced about a central axis 8 and mounted in a plastics housing 11. The plastics housing 11 can be mounted on a body of, for example, an autonomous vehicle or other device whose location is to be determined. The light detecting devices 10 are arranged in a common plane, typically an in use horizontal plane, for measuring the light received at eight different compass points around the light detection apparatus. The light detecting devices 10 face outwardly from the central axis 8. Preferably, separating members 5 are positioned between adjacent ones of the light detecting devices 10. The separating members 5 serve to restrict the field-of-view of each device 10. It is also preferred to mount the detecting devices 10 radially inwardly from the periphery of housing 11, as shown in FIG. 1A, as the separating members 5 then have a greater effect in shaping the field-of-view of the light detecting devices.

Preferably, each light detecting device 10 receives light over, or substantially over, an incident beam angle i of substantially 45°, realistically between 40° and 50°, in a first in use horizontal plane perpendicular to the central axis 8. Each light detecting device 10 also receives light over a half cone angle of at least 5°, and typically 25°, in a second vertical plane passing through the central axis 8 and through the respective detecting device 10. The incident beam angle over which each light detecting device 10 receives light in said second plane typically extends from the horizontal upwards. The light detectors receive light from the environment surrounding the vehicle on which the light detection apparatus is supported.

Figure 1B:
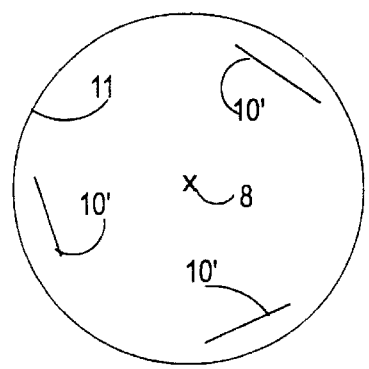

An alternative arrangement is shown in FIG. 1B, in which three light detecting devices 10' are provided. The light detecting devices 10' are arranged in a non-equi-angular manner, but still about the vertical axis 8. The light detecting devices are able to receive light over an incident beam angle of around 120° so that the majority of the light approaching the housing 11 is detected by at least one detector 10'.

Figure 1C:
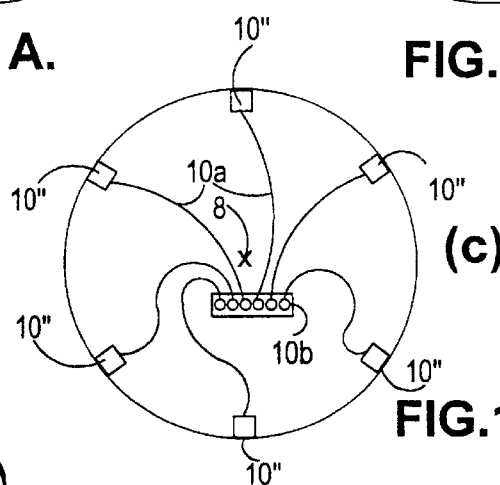

A further alternative arrangement is shown in FIG. 1C. In this arrangement, the light detectors form a charge-coupled device (CCD) comprising a number (in this case six) of light receivers 10" which conduct the received light via optical conductors 10a to a central array of light detectors 10b where the light is detected. This is in contrast to the arrangements described above in which the light incident at any one of the detectors 10, 10' is received and detected at the same location.

Figure 1D:
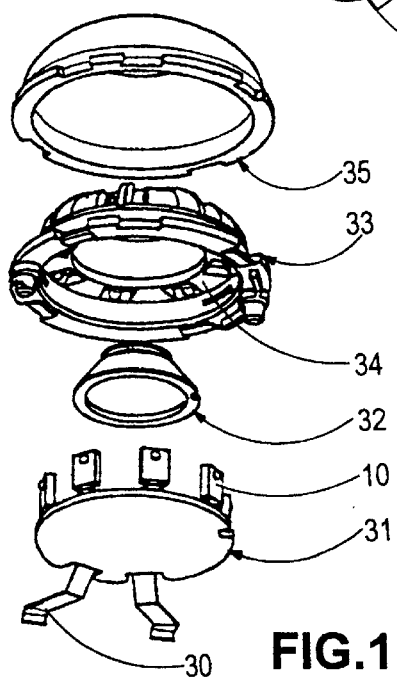
FIG. 1D is an exploded view of the light detection apparatus.

FIG. 1D is an exploded view of the light detection apparatus. A printed circuit board 31 supports the array of light detecting devices 10. Leads 30 carry signals from the board 31. The detecting devices 10 are held in position between an insert 32 and an outer ring 33. Ribs 34 of the outer ring 33 fit between adjacent ones of the light detecting devices 10. The ribs 34 serve the function of separating members 5 in FIG. 1A and help to define the angle of view of the detector, such that each detector provides a measurement indicative of light seen only by itself. A hemispherical transparent plastics part 35 fits over the outer ring and the devices and shields the devices. With this arrangement, the light detectors can receive light from a full 360° field-of-view. The apparatus is compact and rugged and can easily be accommodated on an autonomous vehicle. It is particularly suitable for positioning on an upper face of an autonomous vehicle.

Figure 1E:
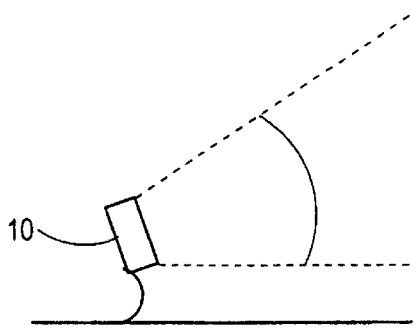
FIG. 1E is a side view of the light detection apparatus.

FIG. 1E is a side view of the detection apparatus. The light detecting device 10 is supported at an angle to the horizontal so that the field of view of the device extends, in the vertical plane, upwards from the horizon. The device 10 is held in this position by outer ring 33 and insert 32 (not shown).

It is important to derive a set of signals which are distinct for a particular location in which the body is located at the time of making the measurements. This can be achieved by deriving signals which are indicative of the different types of light (natural, incandescent, fluorescent) or colours of light detected at each location. One way of achieving this is to provide a set of separate detectors at each detection position, each detector being responsive to the different type of light.

Figure 2:
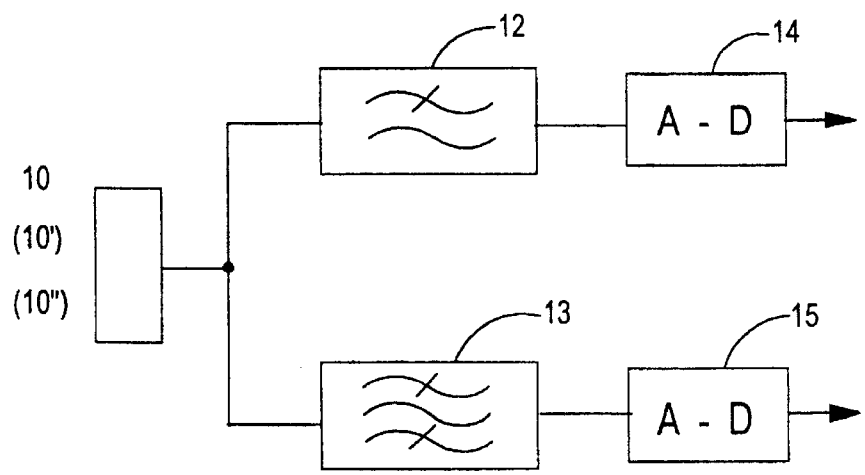
FIG. 2 is a circuit diagram of a filter network associated with each of the light detecting devices of the light detection apparatus of FIG. 1.

A more preferred arrangement is to provide one detector which is responsive to the fill range of expected light types at each detection position. The signal output by each detector is then processed to derive signals indicative of each light type. One form of processing is to filter the output from each detector. The signal from each light detecting device 10, 10', 10" is fed into a filter network as shown in FIG. 2. The filter network comprises a low pass filter 12, typically operating at around 10 Hz, and a band pass filter 13, typically operating at around 70 Hz. The low pass filter 12 passes a signal representative of ambient or natural light detected and the band pass filter 13 passes a signal representative of artificial light, i.e. incandescent and fluorescent light detected.

There could, however, be two band pass filters, typically operating at around 50 Hz and 100 Hz, to pass signals representative of incandescent and fluorescent light, respectively, detected. The outputs of the filters 12 and 13 are fed into analogue-to-digital converters 14 and 15, and the digitised values are stored.

Figure 4:
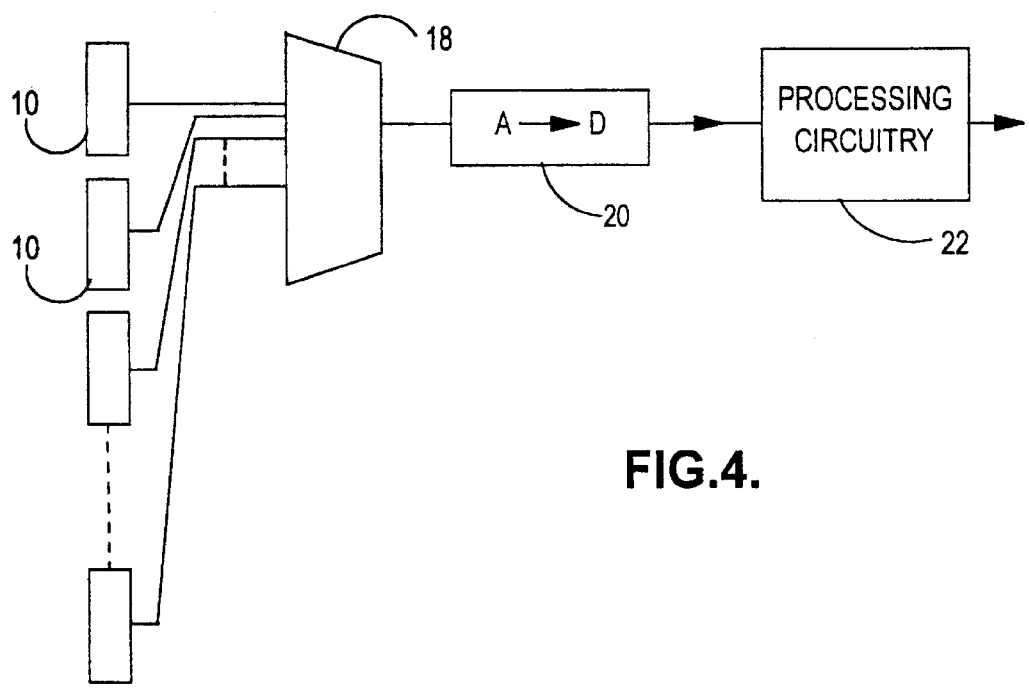
FIG. 4 is an alternative apparatus for processing the signals received from the light detecting devices of FIG. 1.

Another form of processing is to convert the signal into digital form and to monitor the digitised signal over a time interval to derive values indicative of the different light types. The signal returned by a light detector 10 is shown in FIG. 3. The received signal has two components. There is a constant or d.c. quantity 47 caused by natural light, such as daylight, and a time-varying quantity caused by artificial light sources, such as incandescent lights and fluorescent lights. Incandescent lights vary in brightness according to the frequency of the mains electricity supply which passes through them. While, of course, natural light does have a frequency, the varying amplitude of the light will not be detected due to the light detecting device smoothing the received light into an average value. Monitoring over a 10 ms period has been found to be effective. FIG. 4 shows apparatus for performing this method. Outputs from each light detector 10 are fed to processing circuitry 22 on a time-multiplexed basis. A multiplexor 18 couples the output from light detector 10 to an analogue-to-digital converter 20 and the processing circuitry 22. The processing circuitry 22 looks for the minimum (45, FIG. 3) and maximum (46, FIG. 3) values of the received signal over the monitored time period. From the maximum and minimum values, the processing circuitry can derive the peak-to-peak range of the time-varying portion of the light, this being the difference between the maximum and minimum values. The d.c. value of the light is equivalent to the minimum value 45. The processing can be performed by digital logic circuitry in the form of a FPGA, an ASIC or by software running on a microprocessor. The multiplexor 18 operates to sequentially receive a signal from each of the light detectors 10.

The light detection apparatus described above have eight, three and six light detecting devices 10, 10', 10" respectively. However, it is possible to provide as few as two light detecting devices (provided that they are substantially equi-angularly spaced about the axis 8) or more than eight light detecting devices. However, there should preferably be an even number of light detecting devices and it is preferable that they are equiangularly spaced about a central vertical axis in order to provide the body or housing with rotational symmetry. It is appreciated that the desirability of rotational symmetry diminishes as the number of light detecting devices provided increases. Each light detecting device, preferably, receives light over an incident beam angle in an in use horizontal plane calculated approximately by dividing 360° by the number of detecting devices provided. Again, the desirability of this preferred feature diminishes as the number of light detecting devices increases.

The light detecting devices 10, 10', 10" will detect visible and infra-red light. It is, however, envisaged that separate detectors, preferably at each detector location, could be provided for visible and infra-red light in order to provide signals and stored readings which are more readily distinguished from those taken at other locations. It is also envisaged that the incoming visible light may be separated, with appropriate filters, into a number of distinguishable colours for reception by separate detectors. This would be particularly effective if the filters were to separate the incident visible light into red, blue and green light so that separate readings of each primary colour could be taken. Equally, the complementary colours of magenta, yellow and cyan could be used as, indeed, could other sets of colours (not necessarily three in number) which would allow distinct signals to be detected and stored. This adds to the distinctiveness of any one signal or stored reading from another and assists with the ability of the apparatus to accurately distinguish between readings taken at two distinct locations.

FIGS. 5A and 5B illustrate a conversion process performed by the light detection apparatus. Light received by a light detector 10 varies exponentially with distance from a constant source of fixed luminosity. Close to a light source, a small change in the position of the detector causes a large change in light measurements. However, when the detector is remote from a light source, a small change in the position of the detector causes only a small change in light measurements. This exponential relationship makes linear comparisons difficult, as comparing light detector measurements with one another varies widely according to distance from a light source. FIG. 5A shows how actual light intensity varies (vertical axis) with distance from a light source (horizontal axis). The processing circuitry 22 converts the actual light intensity measurement returned by a light detector 10 to a new value which varies more linearly with distance from the source. This is a logarithmic type of conversion. This conversion can be performed by using a look-up table (FIG. 5B) stored by the processing circuitry 22. The look-up table can be compiled by inspecting the range of light values returned by a light detector as the detector is moved in equal steps from a light source. For simplicity, the actual light measurements returned by a light detector are converted to a value in the range 0 . . . 100, as shown in FIG. 5B.

Figure 6:
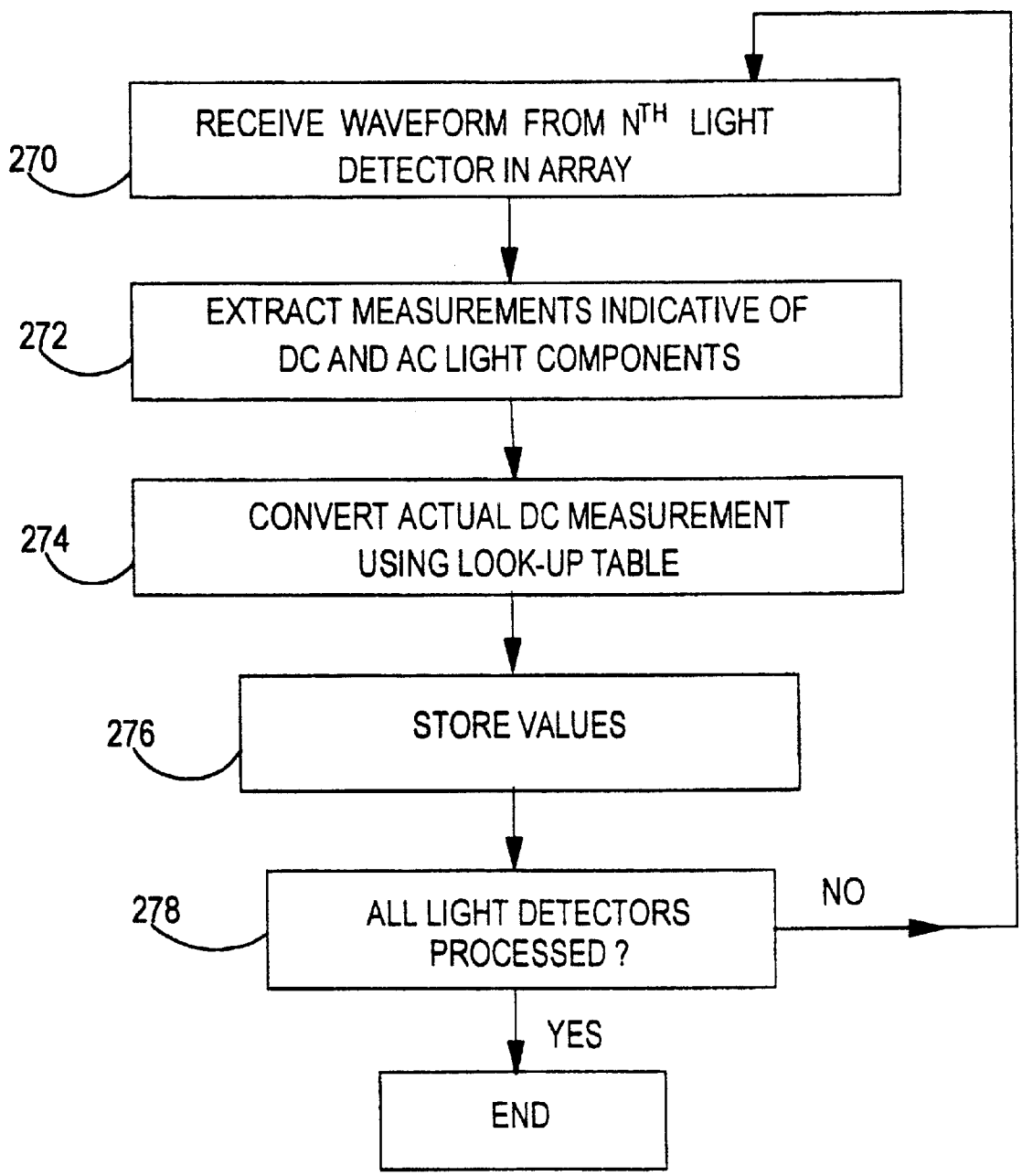
FIG. 6 shows a method of storing light measurements.

FIG. 6 shows the steps performed by light detection apparatus of FIG. 4 to store measurements. Firstly, at step 270 the apparatus receives a waveform from a light detector 10 in the array of detectors. It extracts the measurements that it requires (step 272), as described above, and converts the dc measurement using the look-up table before storing the measurements. This is repeated for each of the light detectors (step 278).

Figure 7:
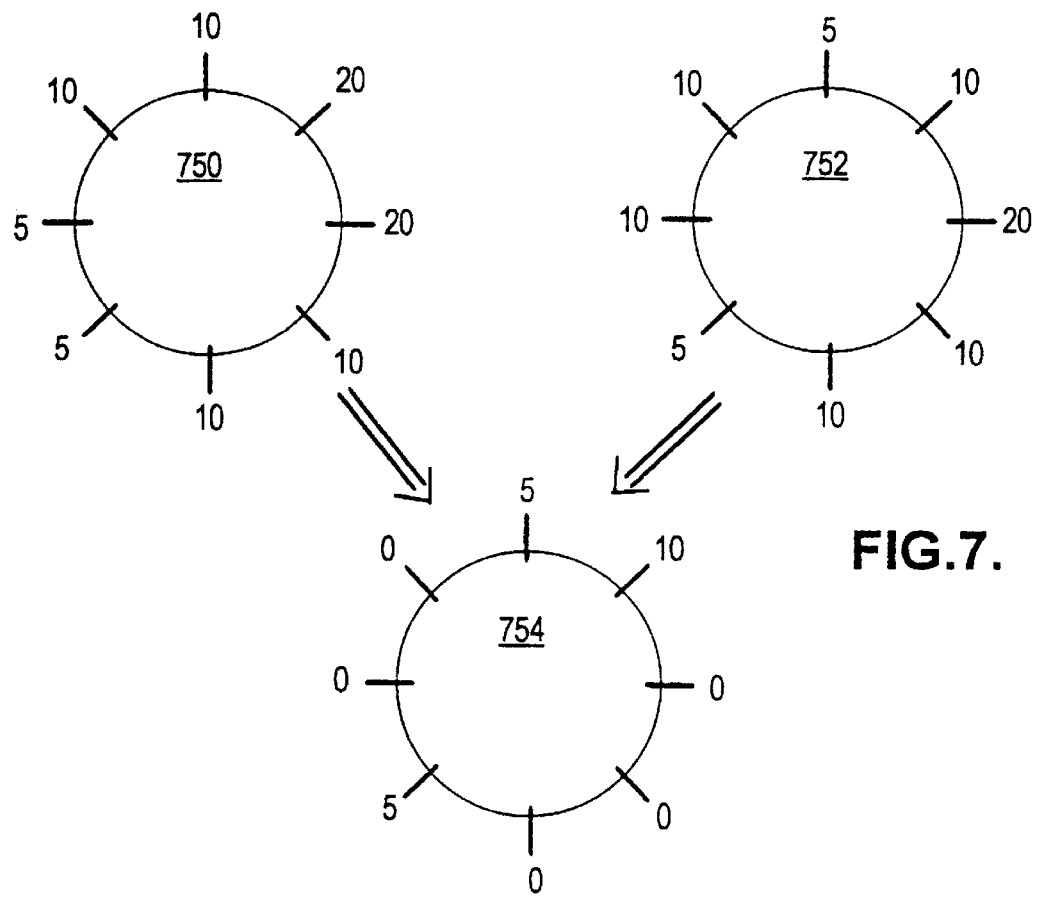
FIG. 7 shows an example of comparing two sets of light measurements.
Figure 8:
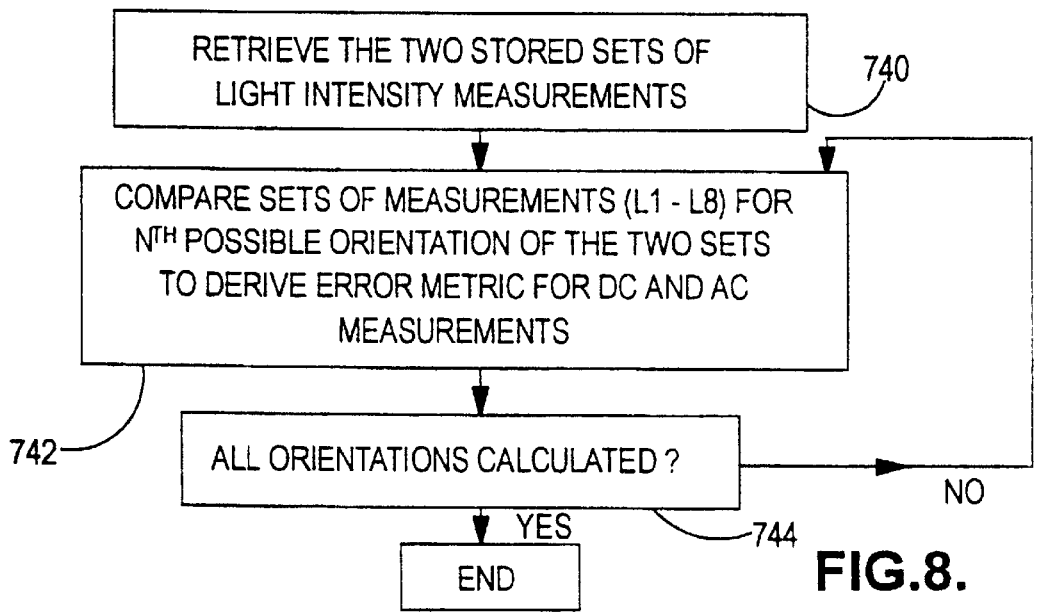
FIG. 8 shows a method of comparing light measurements.

A process for matching two sets of light measurements, so as to determine whether the positions at which those measurements were made are the same, will now be described. FIG. 7 shows two sets of readings returned by the light compass 17. Set 750 shows the readings for a first position of the cleaning device and 752 for a second position of the cleaning device. The numbers correspond to the converted measurements returned by the light detectors in each of the eight directions around the cleaning device. FIG. 8 shows the steps in the method of comparing two sets of light compass measurements. A difference is calculated between the detector measurements for each detector direction, this difference being shown at 754 in FIG. 7. A total difference between the two sets of readings (5+10+0+0+0+5+0+0=20 in the example of FIG. 7) is derived and then divided by the number of detectors (8 detectors in FIG. 7) to derive an error metric. The light detector can individually consider the dc (natural light) and ac (artificial light) components of the received light in this manner. However, it is preferred not to convert the measurements of ac light using the look-up table as the measurements tend to be lower than dc measurements and the conversion would unduly distort them. The result of this comparison process is an error metric indicative of the similarity of the two sets of readings taken at the two positions. An error metric is derived for each possible orientation of the two sets of measurements (eight in all.) The reason for comparing the two sets of measurements in different orientations is because although the two sets of measurements may have been taken while the vehicle was in the same position, the vehicle may not have been pointing in the same direction. By comparing the measurements in different orientations, a suitable match can be found under these conditions.

The resulting set of error metrics can be weighted according to various criteria and finally compared with a threshold to decide whether a particular orientation of the two sets of measurements is good enough to represent a match.

One particular application of light detection apparatus as described above is to help locate an autonomous vehicle, typically a robotic cleaning device such as a robotic vacuum cleaner, in a room by identifying when the light detected by the apparatus is the same or substantially the same as light previously detected by the light apparatus. The information received from the light detection apparatus, in conjunction with information received from obstacle avoidance sensors, can then be used to navigate the autonomous vehicle around a room.

Figure 9:
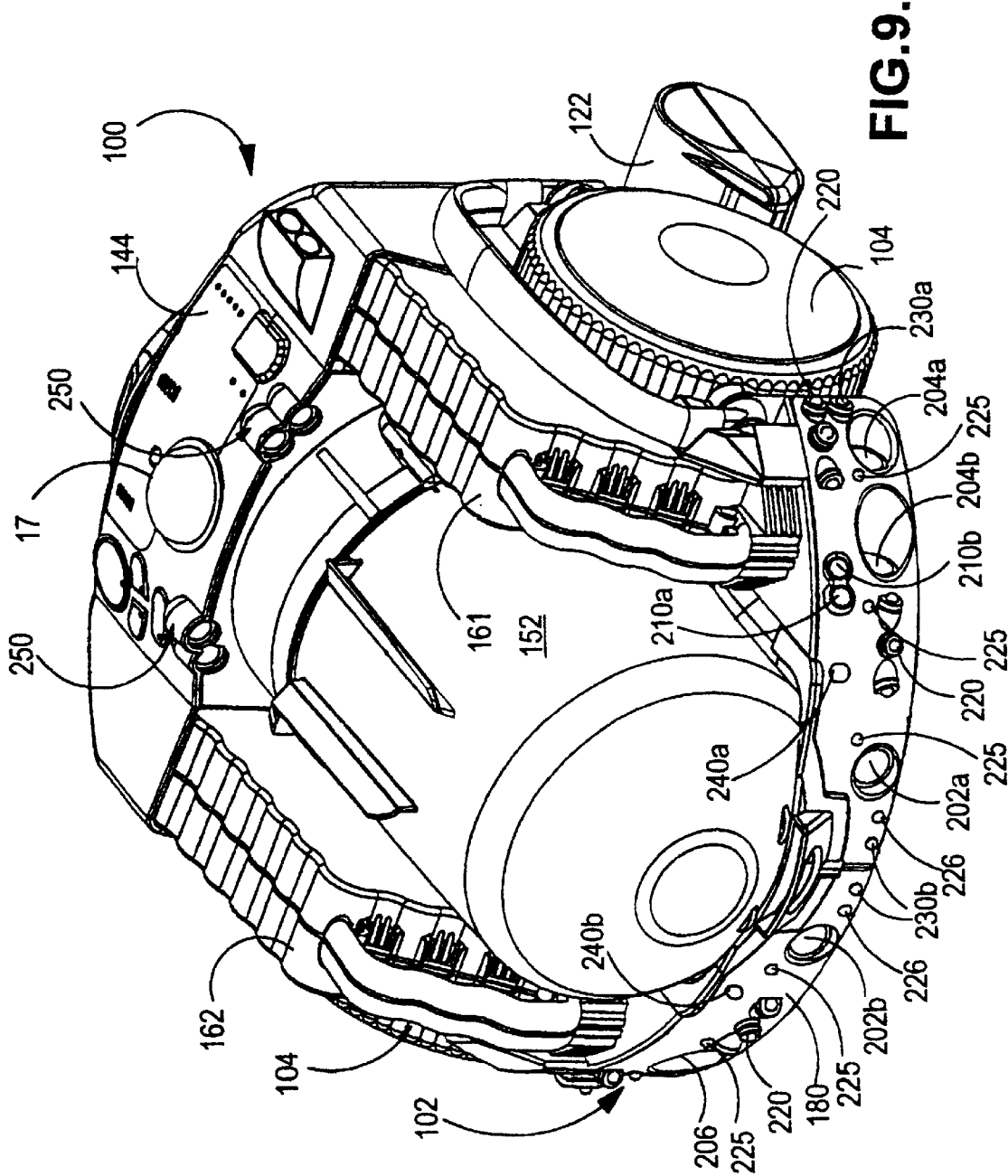
FIG. 9 is a perspective view of a robotic vacuum cleaner, incorporating the light detection apparatus.

FIG. 9 shows a robotic, or autonomous, floor cleaning device in the form of a robotic vacuum cleaner 100 comprising a main body or supporting chassis 102, two driven wheels 104, a brushbar housing 122, two rechargeable batteries 161 and 162, a dust separating apparatus in the form of a dual cyclonic separator 152 of the type more fully described in EP-A-0042723, a user interface 144 and various sensors 202, 204, 206, 208, 210, 220, 230, 240, 250 which will be more fully described. The light detection apparatus, or light compass 17, is mounted on the upper face of the cleaning device 100. In this position, the light detection apparatus 17 has an unobstructed field-of-view around the cleaning device. The detecting devices within the light detection apparatus are arranged as shown in FIG. 1E, with their field-of-view extending upwardly from the horizon in a vertical plane so that the detecting devices are not obstructed by parts of the cleaning device.

Figure 10:
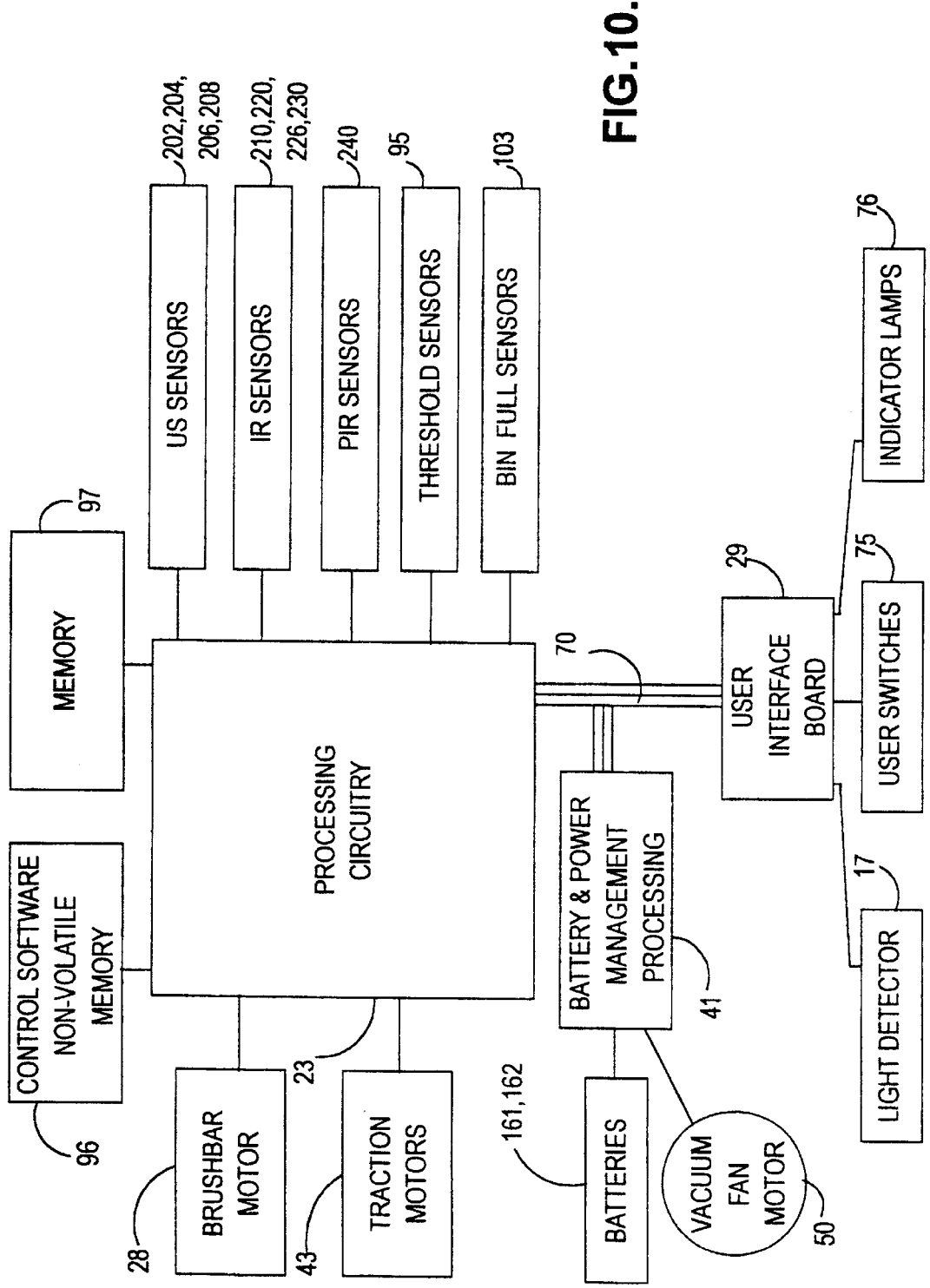
FIG. 10 is a circuit diagram of a power management system and a navigation system for the robotic vacuum cleaner shown in FIG. 3.

FIG. 10 shows a control circuit for the cleaning device of FIG. 9. The circuit comprises two rechargeable batteries 161, 162, a battery and motor management system 41, a motor 50 for driving a suction fan, traction motors 43 for driving the left and right hand wheels 104 of the vacuum cleaner, a motor 28 for driving the brush bar of the vacuum cleaner and processing circuitry 23, which includes a microprocessor and field programmable gate arrays (FPGA). A user interface board 29 provides a plurality of user switches 75 by which a user can control the cleaning device and a plurality of indicator lamps 76 by which the cleaning device can indicate to the user. The user interface board also couples to the light detector 17, as the upper face of the cleaning device provides the light detector with an unobstructed view of the environment. A communications bus 70 couples the processing circuitry 23 to the battery and motor management system 41 and the user interface board 29. Measurements from each of the light detection devices 10 within the light detection apparatus 17 are carried along bus 70 to processing circuitry 23 where all of the above described processing is performed. The sets of light measurements are stored in memory 97 and the look-up table (FIG. 5B) is stored in a non-volatile memory 96. Control software for performing the processing of the light measurements made by the light detection devices, for comparing the measurements and for controlling navigation of the cleaning device is stored in memory 96 for execution by processing circuitry 23.

The robotic vacuum cleaner is also equipped with a plurality of infra-red transmitters 210a, 220, 226, 230a and infra-red receivers 225, a plurality of ultrasonic transmitters 202a, 204a, 206a, 208a and ultrasonic receivers 202b, 204b, 206b, 208b, threshold detectors (95, FIG. 10) for detecting the presence of a portable threshold locator placed, for example, at the entrance to a room or at the edge of a staircase and one or more pyroelectric or passive infra-red (PIR) detectors 240a, 240b for detecting heat sources near to the cleaning device, such as animals and fires. The four main ultrasonic receivers 202b, 204b, 206b, 208b face forwards, rearwards and to opposite sides of the robotic vacuum cleaner. The signals received by these receivers not only provide information representative of distance from a feature of the room or from an object in the room but the amplitude and width of the received signals vary according to the sensed size, shape and type of material of the object.

Figure 11A:
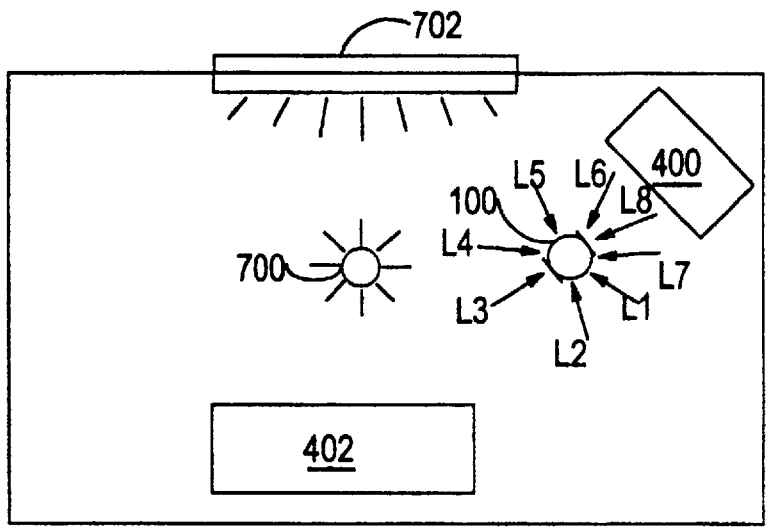
FIGS. 11A and 11B show the cleaning device in a typical room and the measurements made by sensors on the device.
Figure 11B:
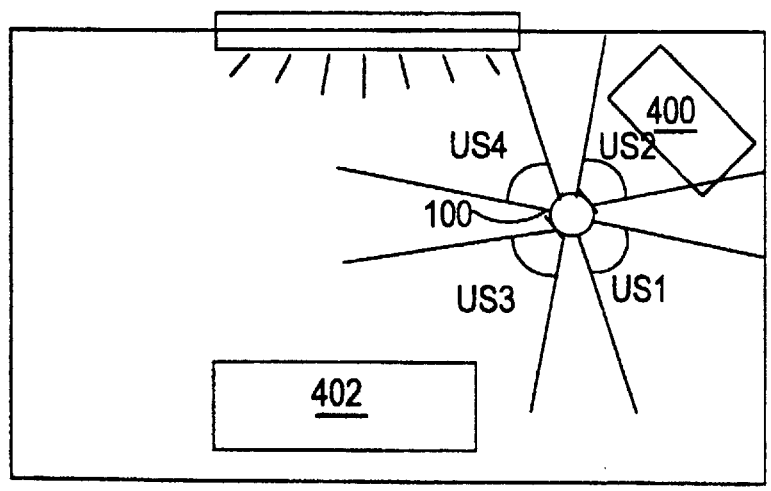

FIGS. 11A and 11B show what information the device receives from its sensors. These FIGS. show the cleaning device 100 in a room that contains the obstacles of a table 400 and sofa 402. The cleaning device measures, using its light compass 17, light received from eight different directions (L1, L2, L3, L4, L5, L6, L7, L8). This combination of measurements has generally been found to be unique within a given room to within an area of several widths of the robotic device. The room in FIG. 11 is illuminated by a combination of natural light from a window 702 and an artificial source 700. Light from the sources is reflected by objects 400, 402 and walls of the room before it reaches the light compass 17 on the cleaning device. In addition to the light compass 17, the cleaning device also has the set of ultrasonic sensors 202, 204, 206, 208, shown located at the front, left, right and back of the cleaning device. FIG. 11B shows the measurements that the ultrasonic sensors make. Each ultrasonic sensor provides a signal US1, US2, US3, US4 which is indicative of the distance of objects from the cleaning device. A combination of the light compass data L1 . . . L8 and ultrasonic sensor data US1 . . . US4 allows the cleaning device to uniquely identify its position within the room.

Figure 12:
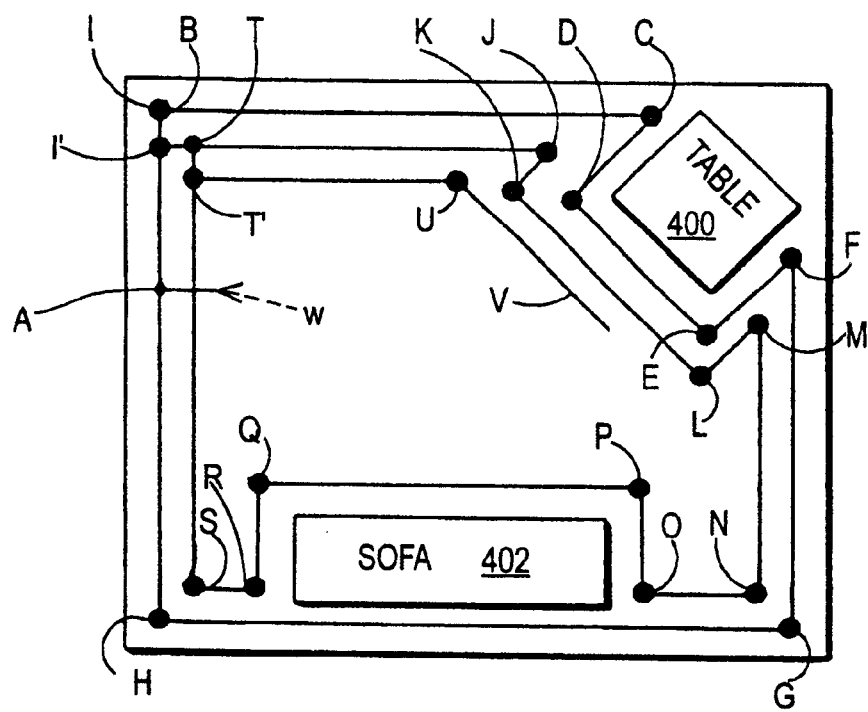
FIG. 12 shows a way in which the cleaning device can navigate around a room.
Figure 13:
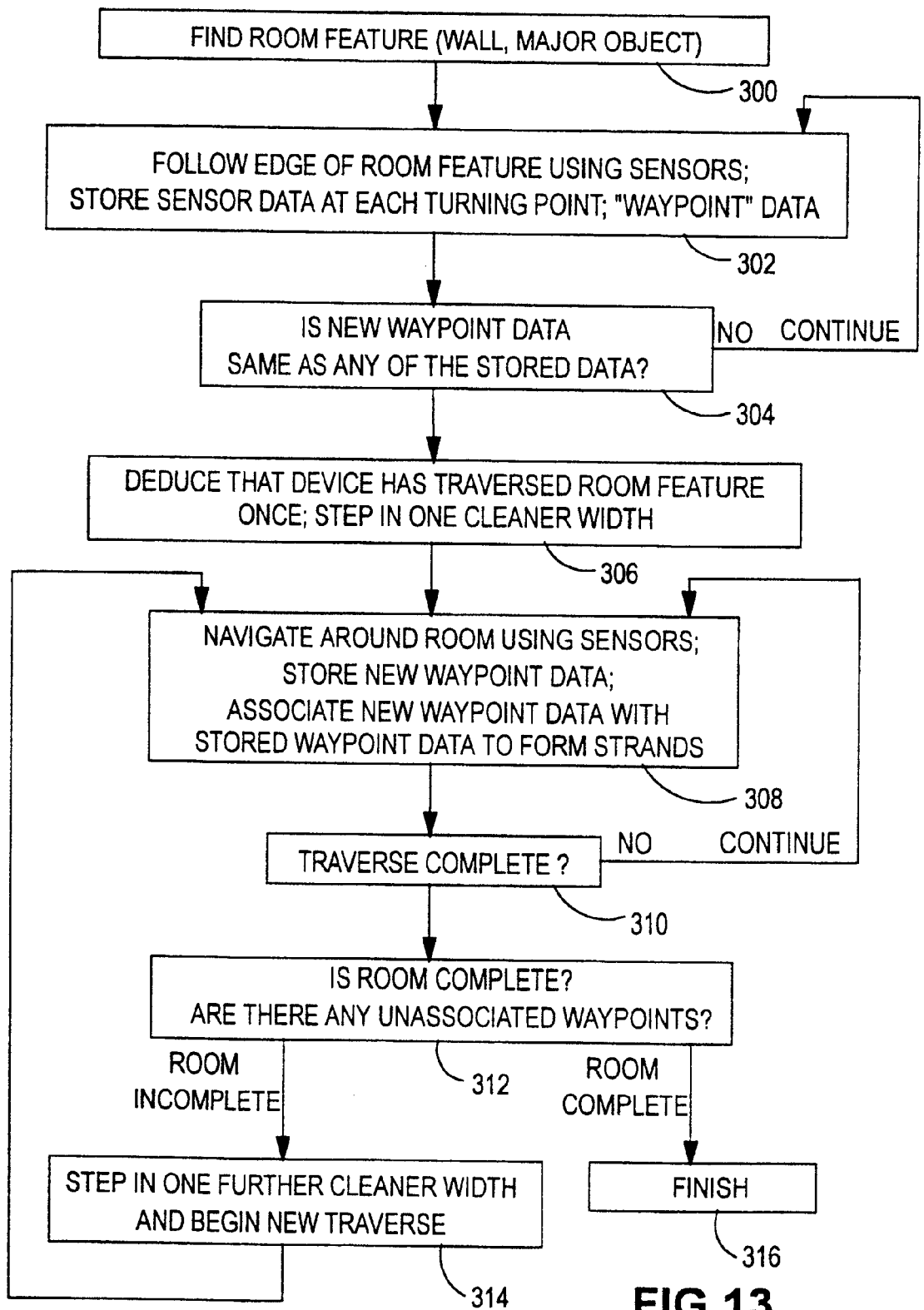
FIG. 13 shows a flow diagram of a method of controlling the cleaning device to navigate around a room in the manner shown in FIG. 12.

FIGS. 12 and 13 illustrate one method of operating the robotic vacuum cleaner to clean a room. The method causes the cleaner to traverse the room in a generally spiralling manner. The cleaner is, typically, placed alongside a wall or freely in the room (position W, FIG. 12). Firstly, it finds a room feature (step 300; A, FIG. 12). Preferably this is a wall of the room or a major object or feature in the room. Once it has found a room feature, the cleaning device then moves forwardly along the edge of the room. This period is called the "perimeter scan", as the machine follows the perimeter of the room as closely as possible, the machine keeping the wall (or other obstacle) close to the left-hand side of the machine. This is shown as points A–H in FIG. 12). The machine keeps the wall close to the left-hand side of the machine as this is the side from which the cleaner head 122 protrudes. The various sensors on the cleaner detect obstacles in the room and other room features, such as corners of a room and fireplaces, and the processing circuitry 23 navigates the robotic vacuum cleaner in order to avoid any such obstacles and to change direction when a feature of a room is reached. At each change of direction caused by reaching a feature of the room, the processing circuitry 23 stores information received from the light detector 17 and also from the four main ultrasonic receivers 202b, 204b, 206b, 208b in memory 97. This is the information shown in FIGS. 11A, 11B. These points are called "way points" (B, C, D . . . FIG. 12). While the described embodiment uses readings from a light detector 17 and ultrasonic sensors, readings from other sensors can be used. The processing circuitry may also store information on the direction in which the cleaner turns at each change of direction. Each time a way point is reached the cleaner monitors the information received from the light detector 17 and the four ultrasonic receivers 202b, 204b, 206b, 208b and compares this with way point information previously stored in memory 97 (step 304). When the robotic vacuum cleaner reaches a position in which the information received from the light detector 17 and the four ultrasonic receivers 202b, 204b, 206b, 208b is the same or substantially the same as information previously stored (position I is the same as position B in FIG. 12) the processing circuitry 23 determines that the robotic vacuum cleaner has completed one traverse, or circuit, around the room (step 306) and is programmed to cause the robotic vacuum cleaner to step inwards by substantially one cleaner width. The cleaning device takes the new waypoint I', for use in matching at the end of the second circuit, rotates 90° to the right, and begins a second circuit. The processing circuitry 23 continues to store way point information and compares the information received from the light detector 17 and the four main receivers 202b, 204b, 206b, 208b with previously stored information (step 308). At T, the cleaning device matches the two sets of light measurements at position T with position I' and moves inwardly again. The cleaner progresses around the room in a generally inwardly spiralling manner.

If the robotic vacuum cleaner is initially placed in the middle of the room, it will travel until it finds a wall or obstacle. If it finds a wall it will then follow the path described above. If it finds a feature (such as a central fireplace) or an obstacle in the centre of the room, it will complete a circuit around that feature or obstacle and then follow a generally outwardly spiral path.

Figure 14:
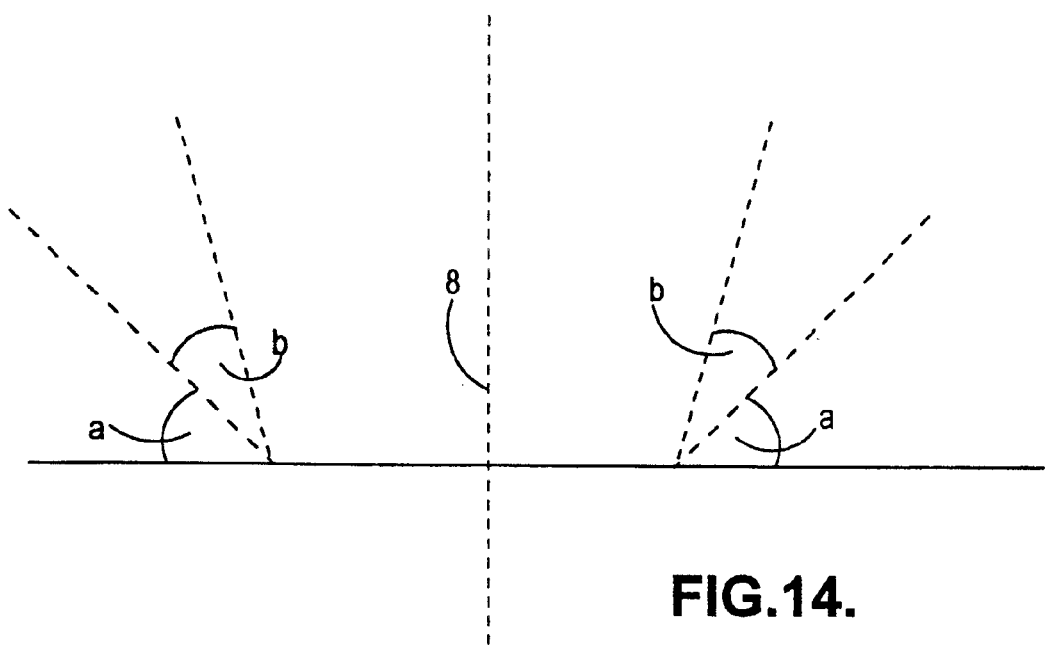
FIG. 14 is a schematic illustration of a fourth embodiment of light detection apparatus according to the invention.

The above embodiment is given by way of example and various modifications will be apparent to persons skilled in the art without departing from the scope of the invention defined in the appended claims. For example, as it is preferable to detect light received from at least eight compass points around the light detection apparatus, it would be possible, for example, to use two separate arrays each of four light detecting devices equi-angularly spaced about a central axis and to angularly offset one array relative to the other. Similarly, different numbers of light detecting devices can be provided by stacking arrays of appropriate numbers of detectors. In a further modification falling within the scope of the invention, arrays of light detectors can be provided so that a first array receives incident light up to a first angle a to the horizontal (say 50°), and a second array receives incident light between the first angle and a second angle b (perhaps 80°) to the horizontal. This type of arrangement is illustrated schematically in FIG. 14.

What is claimed is:

1. Light detection apparatus for determining the location of a body within an area, the apparatus comprising:
at least two light detecting devices for mounting on the body and capable of receiving light from the environment in which the body is located, the devices being located at respective detecting points which are angularly spaced about a vertical axis,
means for supplying information representative of the levels of at least two different light types received at each detecting point, and
means for comparing information received from the light detection apparatus with information previously received from the light detection apparatus and stored in a memory so as to identify when the light detected by the light detection apparatus is the same or substantially the same as light previously detected by the light detection apparatus.

2. Light detection apparatus as claimed in claim 1 wherein the light types are ambient light, incandescent light and/or fluorescent light.

3. Light detection apparatus as claimed in claim 1 wherein the information supplying means filters the signal from the light detecting devices to derive information about the different light types.

4. Light detection apparatus as claimed in claim 1, wherein the information supplying means digitises the signal from the light detecting device over a time period, monitors the digitised signal to derive a minimum and maximum value of the signal and uses these values to derive information indicative of dc and time-varying light types.

5. Light detection apparatus as claimed in claim 1 wherein the light types are colours of light.

6. Light detection apparatus as claimed in claim 5 wherein the colours are: red, blue and green or magenta, yellow and cyan.

7. Light detection apparatus as claimed in claim 5 or 6, wherein visible light is separated into a plurality of colours, each colour being detected by a separate detector.

8. Light detection apparatus as claimed in claim 1, comprising separate detectors for detecting visible and infra-red light.

9. Light detection apparatus as claimed in claim 1, wherein the points at which light is received are spaced equi-angularly about the vertical axis.

10. Light detection apparatus as claimed in claim 1, wherein the light detecting devices are all supported in a common plane.

11. Light detection apparatus as claimed in claim 1, wherein the light detecting devices receive light over an incident beam angle in a vertical plane extending upwardly from the horizon.

12. Light detection apparatus as claimed in claim 1, wherein each light detecting device receives light over, or approximately over, an incident beam angle in a first plane perpendicular to the vertical axis calculated by dividing 360° by the number of light detecting devices provided.

13. Light detection apparatus as claimed in claim 1, wherein a shield member is positioned between adjacent ones of the light detecting devices.

14. Light detection apparatus as claimed in claim 1, wherein the light detecting devices make up a CCD array.

15. Light detection apparatus as claimed in claim 1, wherein the light detecting devices are supported within a housing for mounting on the body.

16. An autonomous vehicle comprising power operated means for moving the vehicle around an area and a navigation system for identifying the location of the vehicle, the navigation system including the light detection apparatus according to claim 1 for allowing the vehicle to determine when it has returned to a similar position in the area.

17. An autonomous vehicle as claimed in claim 16, wherein the vertical axis of the light detection apparatus is located centrally of the vehicle.

18. An autonomous vehicle as claimed in claim 16 or 17, wherein the light detection apparatus is supported on an uppermost part of the body.

19. An autonomous vehicular as claimed in claim 16, in the form of a robotic cleaning device.

20. An autonomous vehicle as claimed in claim 19, in the form of a robotic vacuum cleaner.

21. A method of determining the location of a body within an area comprising:

using at least two light detecting devices mounted on the body to receive light from the environment in which the body is located, the devices being located at respective detecting points which are angularly spaced about a vertical axis, deriving information representative of the levels of at least two different light types received at each detecting point, and comparing information received from the light detection apparatus with information previously received from the light detection apparatus and stored in a memory so as to identify when the light detected by the light detection apparatus is the same or substantially the same as light previously detected by the light detection apparatus.

22. An autonomous floor cleaning device for cleaning a floor area comprising:

power operated means for moving the vehicle around the floor area and a navigation system for identifying the location of the vehicle and for controlling movement of the cleaning device, wherein the navigation system includes a light detection apparatus comprising:

at least two light detecting devices mounted on the body and capable of receiving light from the environment in which the cleaning device is located, the detecting devices being located at respective light detecting points which are angularly spaced about a vertical axis, means for supplying information representative of the levels of at least two different light types received at each detecting point, and means for comparing information received from the light detection apparatus with information previously received from the light detection apparatus and stored in a memory so as to identify when the light detected by the light detection apparatus is the same or substantially the same as light previously detected by the light detection apparatus, indicative of the cleaning device returning to a similar position in the area.

23. An autonomous floor cleaning device as claimed in claim 22 wherein the navigation system is arranged to cause the cleaning device to perform a spiralling pattern of covering the floor area and an indication from the light detection apparatus that the cleaning device has returned to a similar position in the area causes the cleaning device to move inwardly or outwardly to begin another circuit of the floor area.

24. An autonomous floor cleaning device as claimed in claim 22 or 23, wherein the vertical axis of the light detection apparatus is located centrally of the vehicle.

25. An autonomous floor cleaning device as claimed in claim 22, wherein the light detection apparatus is supported on an uppermost part of the body.

26. An autonomous floor cleaning device as claimed in claim 22, wherein the means for supplying information supplies information representative of at least two different light types received at each detecting point.

27. An autonomous floor cleaning device as claimed in claim 22, in the form of a robotic cleaner.

28. A method of operating an autonomous floor cleaning device to clean a floor area, the cleaning device comprising power operated means for moving the vehicle around the floor area and a navigation system for identifying the location of the vehicle and for controlling movement of the cleaning device and wherein the navigation system includes a light detection apparatus, the method comprising:

using at least two light detecting devices mounted on the body to receive light from the environment in which the cleaning device is located, the detecting devices being located at respective light detecting points which are angularly spaced about a deriving information representative of the levles of at least two different light types recived at each detecting point, and comparing information received from the light detection apparatus with information previously received from the light detection apparatus and stored in a memory so as to identify when the light detected by the light detection apparatus is the same or substantially the same as light previously detected by the light detection apparatus, indicative of the cleaning device returning to a similar position in the area.

* * * * *

UNITED STATES PATENT AND TRADEMARK OFFICE
CERTIFICATE OF CORRECTION

PATENT NO.    : 6,590,222 B1
DATED         : July 8, 2003
INVENTOR(S)   : David Lindsey Bisset et al.

It is certified that error appears in the above-identified patent and that said Letters Patent is hereby corrected as shown below:

<u>Column 12,</u>
Line 32, after "about a", add -- vertical axis, --.

Signed and Sealed this

Sixteenth Day of December, 2003

JAMES E. ROGAN
*Director of the United States Patent and Trademark Office*